OR 4,037,931

United States Patent [19]
Ido et al.

[11] 4,037,931
[45] July 26, 1977

[54] LIQUID CRYSTAL DISPLAY CELL DRIVING CIRCUIT

[75] Inventors: Kazuo Ido, Suwa; Shizuo Saito, Okaya, both of Japan

[73] Assignees: Kabushiki Kaisha Suwa Seikosha; Shinshu Seiki Kabushiki Kaisha, both of Tokyo, Japan

[21] Appl. No.: 574,179

[22] Filed: May 2, 1975

[30] Foreign Application Priority Data
May 2, 1974  Japan .................................. 49-49561

[51] Int. Cl.² ............................................. G02F 1/18
[52] U.S. Cl. .............................. 350/160 LC; 340/336; 307/310
[58] Field of Search ............... 350/160 LC; 340/336; 307/310, 297

[56] References Cited
U.S. PATENT DOCUMENTS

| | | | |
|---|---|---|---|
| 3,192,405 | 6/1965 | Patchell | 307/310 |
| 3,219,843 | 11/1965 | Follett | 307/310 |
| 3,921,162 | 11/1975 | Fukai | 350/160 LC X |

OTHER PUBLICATIONS

Collins, John R., "Temperature Sensitive Devices", Electronic World, Oct. 1964, p. 52.
Yhap, E. F., "Transistor with small Temperature Dependence", IBM Technical Disclosure Bulletin, vol. 4, No. 10, Mar. 1962, p. 60.

*Primary Examiner*—Edward S. Bauer
*Assistant Examiner*—Rolf Hille
*Attorney, Agent, or Firm*—Blum, Moscovitz, Friedman & Kaplan

[57] ABSTRACT

A liquid crystal display cell driving circuit adapted to apply a stabilized DC drive voltage having a temperature characteristic corresponding to the temperature characteristic of the display cell is provided. A power source includes a DC converter coupled to the display cell for applying a DC drive voltage thereto. A feedback control circuit is coupled to the DC converter for stabilizing the DC drive voltage. The feedback control circuit further includes a temperature dependent reference voltage means, for effecting a temperature adjustment of the DC drive voltage corresponding to the temperature characteristic of the liquid crystal display cell.

5 Claims, 8 Drawing Figures

LIQUID CRYSTAL DISPLAY CELL DRIVING CIRCUIT

BACKGROUND OF THE INVENTION

This invention is directed to a drive circuit for applying drive signals to a temperature dependent liquid crystal display cell and in particular to a feedback control circuit including a temperature dependent reference voltage element for effecting adjustment of a drive signal in accordance with the temperature dependency characteristic of the display cell.

While digital displays have taken on various forms, the low power consumption characteristic of liquid crystal display cells has caused same to be most often selected for use in devices requiring a digital display. Specifically, in table calculators, pocket calculators, electronic timepieces and particularly electronic wristwatches, the low power consumption characteristic of the liquid crystal display elements is particularly desirable in view of the effect that same has on lengthening the life of a battery power source.

Such liquid crystal display elements are driven by a stable DC drive voltage at a particular temperature. Nevertheless, liquid crystal display cells have a temperature dependency characteristic which causes the voltage required to energize same to decrease in response to a corresponding increase in temperature. Although drive circuits have been provided for applying a uniformly stable DC drive voltage to the liquid crystal display cell, such drive circuits have been less than completely satisfactory due to their failure to compensate for the temperature dependency characteristic of the display cell.

Accordingly, a drive circuit particularly adapted to effect a reduction in the DC drive voltage applied to a liquid crystal display cell corresponding to the decrease in the voltage required to drive such a liquid crystal display element in response to a rise in the temperature thereof is desired.

SUMMARY OF THE INVENTION

Generally speaking, in accordance with the invention, a drive circuit for applying drive signals to a temperature dependent liquid crystal display cell is provided. The drive circuit includes a power source having a DC converter coupled to the liquid crystal display cell for applying a DC drive voltage thereto. A feedback control circuit is coupled to the DC converter to stabilize the DC drive signal. The feedback control circuit includes a temperature dependent reference voltage element for effecting an adjustment in the magnitude of the DC drive voltage applied to the liquid crystal display cell corresponding to the temperature dependency characteristic thereof.

Accordingly, it is an object of this invention to provide an improved drive circuit for driving a temperature dependent liquid crystal display cell.

Still another object of this invention is to provide an improved drive circuit for providing a decrease in the DC drive voltage applied to a liquid crystal display cell corresponding to the decrease in the voltage required to drive a digital display call when the temperature of same is increased.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

DETAILED DESCRIPTION OF THE PREFERRED EMBODIMENTS

Figure 1:
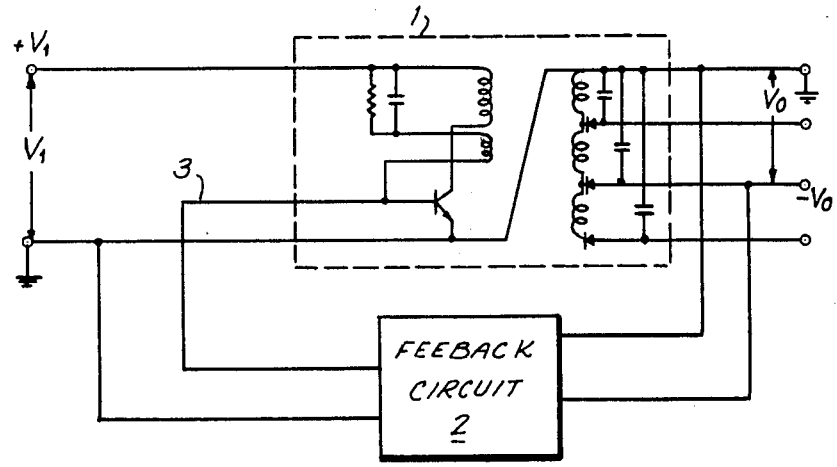
FIG. 1 is a circuit diagram of a liquid crystal display drive circuit DC voltage converter constructed in accordance with the prior art.

Reference is now made to FIG. 1, wherein a liquid crystal display cell drive circuit DC voltage converter constructed in accordance with the prior art is depicted. The DC converter circuit includes a booster circuit 1 for effecting a boosting of the DC voltage $V_1$ applied to the circuit. A feedback circuit 2 is coupled to detect the output voltage $V_o$ and to the input side of the DC converter to effect a stabilization of the output drive voltage $V_o$. The feedback circuit is a conventional fluctuation detecing circuit adapted to detect fluctuations in the output voltage $V_o$ in response to change in the input voltage $V_1$ and in response thereto induce a control signal 3 to effect a stabilization of the output voltage $V_o$. Accordingly, the output voltage $V_o$ produced by the DC converter circuit is stabilized and is particularly suited for use in driving a liquid crystal display cell. Nevertheless, because liquid crystal display cells have a temperature dependency characteristic whereby the voltage required to drive same decreases in response to an increase in the temperature thereof, such conventional feedback circuits are not able to reduce the drive voltage in a manner corresponding to the decrease in the voltage required to effect a driving of a liquid crystal display cell in response to a rise in temperature.

Figure 2:
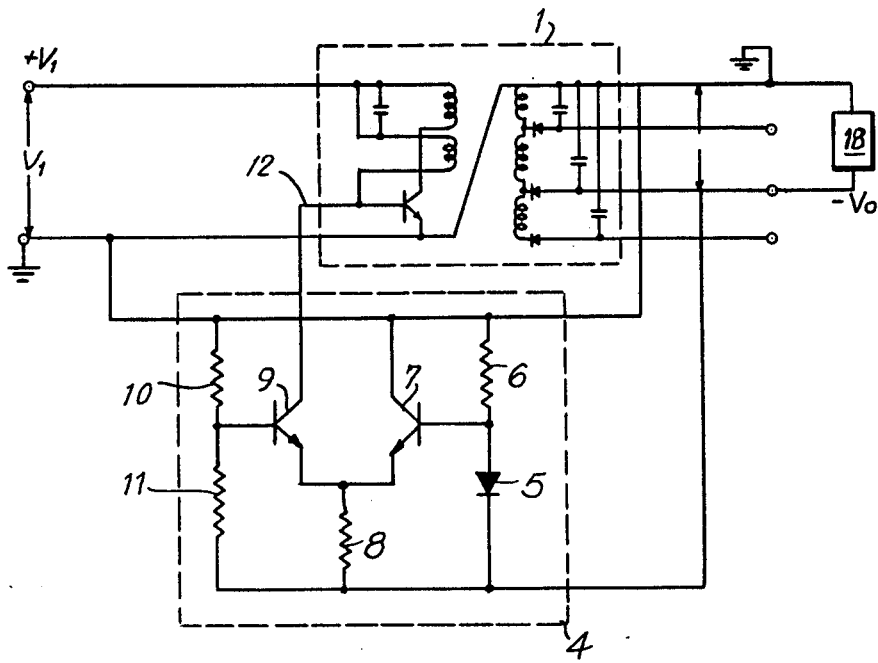
FIG. 2 is a detailed circuit diagram of a drive circuit DC voltage converter constructed in accordance with a preferred embodiment of the instant invention.

Reference is now made to FIG. 2 wherein a drive circuit DC converter including a temperature dependent feedback circuit 4 constructed in accordance with the instant invention is depicted, like reference numerals being utilized to denote like elements depicted in FIG. 1. Control feedback circuit 4 is a differential amplified circuit utilizing the voltage difference between the terminal voltage $V_{R11}$ of resistor 11 and the forward saturation voltage of diode 5 to produce feedback control signal 12 to effect temperature compensation control. Specifically, the feedback control signal 12 is dependent on the forward-saturation voltage of the diode 5 in a manner to be explained more fully below.

Figure 3:
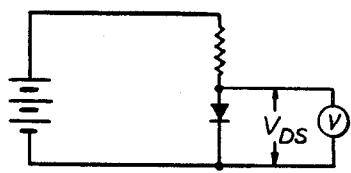
FIG. 3 is a circuit diagram of a circuit particularly suited for measuring the temperature-forward saturation voltage characteristic of a diode.
Figure 4:
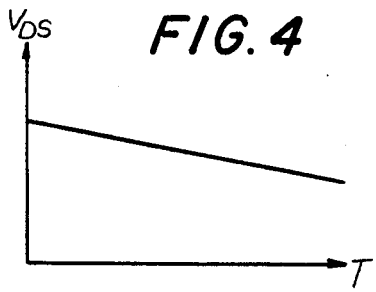
FIG. 4 is a graphical illustration of the temperature-forward saturation voltage characteristic measured by the circuit depicted in FIG. 3.

Reference is now made to FIGS. 3 and 4, wherein a measuring circuit for measuring the forward-saturation voltage of diode 5 and a graphical illustration of said measurements are respectively depicted. It is noted that the forward-saturation voltage $V_{DS}$ decreases in response to an increase in the temperature T thereof.

Figure 5:
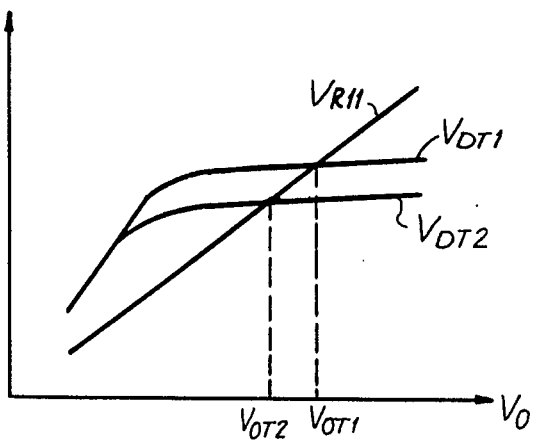
FIG. 5 is a graphical illustration comparing the respective voltage characteristics of a diode at first and second temperatures and further comparing same to the linear temperature characteristic of a resistive element.
Figure 6:
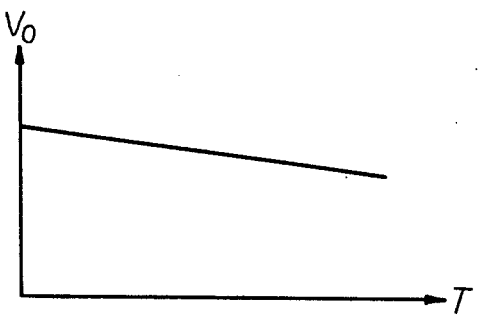
FIG. 6 is a graphical illustration of the output voltage-temperature characteristic of the circuit depicted in FIG. 2.

Accordingly, the difference in forward-saturation voltage caused by an increase in temperature when compared to the voltage characteristic across the resistor 11 in the drive circuit depicted in FIG. 2, represents the manner in which the feedback control 12 is produced by the feedback control circuit 4. As is particularly illustrated in FIG. 5, the $V_o - V_{R11}$ characteristic does not include a temperature responsive characteristic since the voltage across resistor 11 is determined by a division ratio defined by resistors 10 and 11. Instead, the forward-saturation voltage characteristic of the diode 5 when compared to the output voltage $V_o$ provides a temperature dependent reference element. This is indicated by the two different voltage characteristic lines $V_{DT1}$ and $V_{DT2}$ of the forward-saturation voltage across diode 5 taken at two different temperatures $T_1$ and $T_2$, when $T_1$ is a temperature lower than the temperature $I_2$. Accordingly, when the voltage characteristic $V_{R11}$ is higher than $V_D$, the differential amplifier induces a feedback control signal 12 to effect stabilization of the output voltage $V_o$ at the voltage $V_{DT1}$ and/or $V_{DT2}$, respectively, at the temperatures $T_1$ and $T_2$. Thus, the ambient temperature-output voltage characteristic T – $V_o$ is depicted in FIG. 6, and it is noted that same corresponds to the forward-saturation voltage characteristic of diode 5 depicted in FIG. 4.

Figure 7:
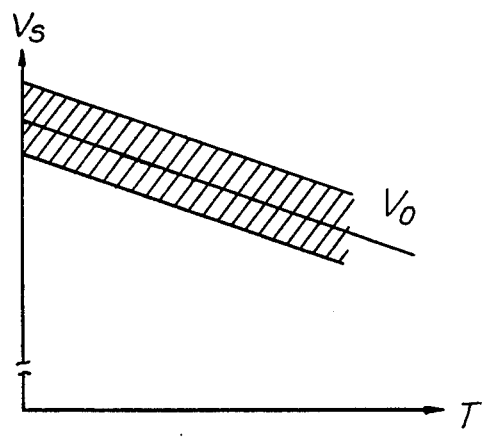
FIG. 7 is a graphical illustration of the range over which the drive voltage for effecting a driving of a liquid crystal display cell varies with respect changes in the temperature thereof.

Reference is now made to FIG. 7 wherein a temperature-voltage characteristic of the DC drive voltage $V_S$ required to effect a stable driving of a liquid crystal display cell and in particular a field effect liquid crystal display cell requiring a reduced voltage drive signal in response to an increase in the temperature thereof is depicted. The $V_o$ characteristic depicted in FIG. 6 is illustrated in sectional lines to depict that the range of temperature dependence of the output voltage of the DC voltage converter corresponds to the temperature dependency characteristic of the driving voltage required to effect driving of the liquid crystal display cell.

Moreover, the temperature dependent feedback control circuit constructed in accordance with the instant invention is disposed between terminals provided for connection to a maximum load 8, which terminals are only two of a plurality of output voltage terminals of the DC voltage coverter. While the load (liquid crystal display) can be connected to the other terminals representative of other output voltages, the voltage detected between the terminals of the maximum load can still be utilized to provide temperature characteristic compensation between each of the respective output terminals. This, the instant invention is also suited for driving circuits having a plurality of output voltages, only a single temperature dependent reference voltage means being required.

Figure 8:
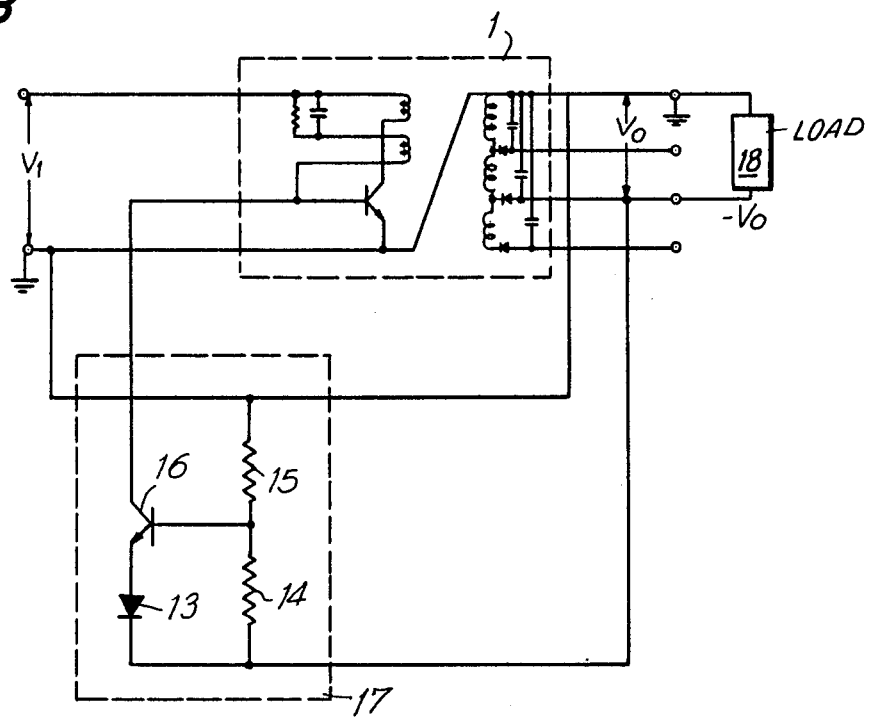
FIG. 8 is a drive circuit DC voltage converter constructed in accordance with an alternate embodiment of the instant invention.

Reference is now made to FIG. 8, wherein a drive circuit DC converter arrangement constructed in accordance with an alternate embodiment of the instant invention is depicted, like reference numberals being utilized to denote like elements depicted in FIG. 1 and 2. The single transistor 16 effects a comparison of the forward-saturation voltage of diode 13 with the voltage across resistor 14, and in response to the differences therebetween, effects changes in the feedback control signal applied to the DC converter circuit. Accordingly, stabilization of the output voltage $V_o$ applied to load 18 depends on the forward saturation voltage of diode 13 thereby rendering the output voltage $V_o$ temperature dependent on the forward-saturation voltage of the diode. Accordingly, a simplifier circuit is provided for use with a power source for driving a liquid crystal display.

It is noted that the instant invention renders the aforesaid DC voltage converter particularly suited for use with a power source for driving a liquid crystal display cell by the use of a diode as a temperature dependent reference voltage element to control a feedback current in responce to the temperature dependency characteristic of the diode.

It will thus be seen that the objects set forth above, among those made apparent from the preceding description, are efficiently attained and, since certain changes may be made in the above constructions without departing from the spirit and scope of te invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A drive circuit for applying drive signals to a temperature dependent liquid crystal display cell comprising in combination power source means including a DC converter coupled to said liquid crystal display cell, said DC converter including an input terminal means and an output terminal means, said output terminal means being coupled to said liquid crystal display cell for applying a DC drive voltage thereto, and feedback control means coupled to said input terminal means and said output terminal means for stabilizing the DC drive signal applied to said display cell, said feedback control means including a temperature dependent diode, said diode having a temperature dependency characteristic corresponding to said liquid crystal display cell to effect an adjustment of the DC drive voltage to compensate for the temperature dependency characteristic of the liquid crystal display cell.

2. A drive circuit as claimed in claim 1, and including fixed reference voltage means, said feedback control means further including transistor means respectively coupled to said DC converter input and output terminal means, said transistor means being coupled to said temperature dependent diode, and to said fixed reference voltage means for effecting adjustment of the DC drive voltage applied to said display cell in response to changes in the voltage across said temperature dependent reference voltage means with respect to said fixed reference voltage means.

3. A drive circuit as claimed in claim 2, wherein said fixed reference voltage means is coupled to a control electrode of said transistor means, and fixed reference voltage means including at least two resistors, one of said resistors being coupled to said input and output terminal means of said DC converter.

4. A drive circuit as claimed in claim 3, wherein said transistor means includes a transistor, the base electrode of said transistor being coupled to both of said fixed reference voltage resistors, and said collector-emitter electrodes being coupled to said temperature dependent diode and to said input terminal means of said DC converter.

5. A drive circuit as claimed in claim 3, wherein said transistor means includes first and second transistors, a first transistor being coupled to both said fixed reference voltage resistors, and being further coupled to the input of said DC converter means, said second transistor being coupled to said temperature dependent diode, and to said input and output terminal means of said DC converter means.

* * * * *